April 22, 1958 R. FENNEMA ET AL 2,831,500
COMBINED RELIEF AND CHECK VALVE CONSTRUCTION
Filed Oct. 1, 1954
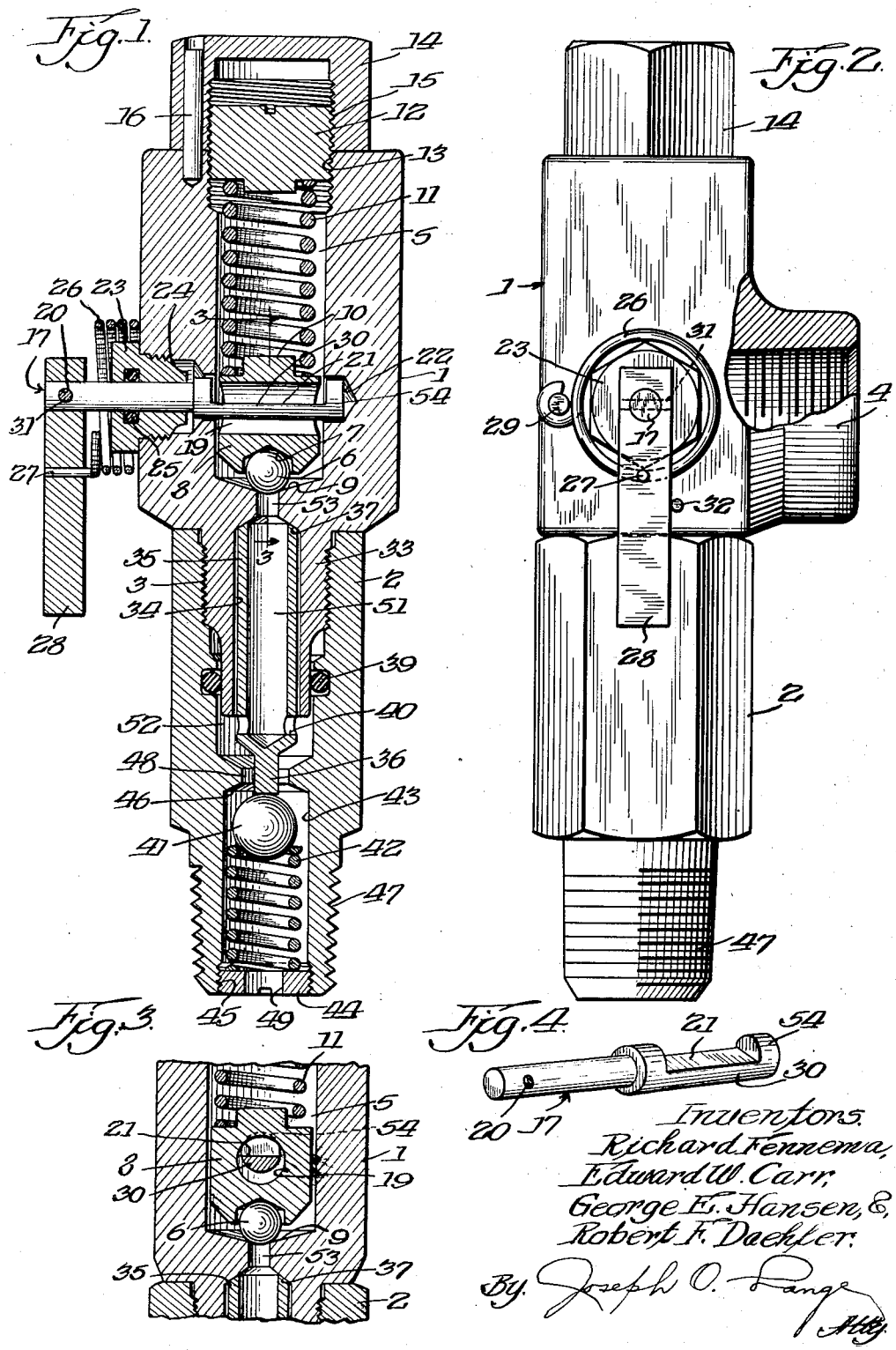
Inventors.
Richard Fennema,
Edward W. Carr,
George E. Hansen, &
Robert F. Daehler.
By Joseph O. Lange

United States Patent Office 2,831,500
Patented Apr. 22, 1958

2,831,500
COMBINED RELIEF AND CHECK VALVE CONSTRUCTION

Richard Fennema, Chicago, Edward W. Carr, Cicero, George E. Hansen, Elmwood Park, and Robert F. Daehler, La Grange, Ill., assignors to Crane Co., Chicago, Ill., a corporation of Illinois Application October 1, 1954, Serial No. 459,706

3 Claims. (Cl. 137—522)

The present invention relates to a novel combined relief and check valve construction.

In explanation of the background of our invention, it should be noted at the outset that heretofore in relief valve constructions an objectionable feature resulting in an expensive time-consuming operation has been the necessity of halting line flow in the course of effecting valve repairs.

It is one of the main objects of our invention, therefore, to provide a check valve feature in combination with an efficient relief valve construction whereby normal line operation may continue in the course of performing any essential relief valve repairs.

It is a further object of our invention to provide a combination check valve and relief valve which may be manually relieved at any time during valve operation thereby greatly enlarging the scope of the safety afforded by our invention.

It is a still further object of our invention to provide a combination check valve and relief valve which automatically resets itself after either a line pressure induced or manually induced blow-off operation in the course of service.

These and other advantages will become more manifest upon proceeding with the following detailed description read in the light of the accompanying drawings, in which—

Fig. 1 is a sectional assembly view of a valve embodying our invention.

Fig. 2 is a side view partly in section of a valve embodying our invention.

Fig. 3 is a sectional view taken on line 3—3 of Fig. 1.

Fig. 4 is a perspective view of the relief valve stem.

Similar reference numerals refer to similar parts throughout the several views.

Referring now more particularly to Fig. 1, the relief valve body or casing 1 is illustrated threadedly engaged to check valve body or casing 2 by means of the threads 3. Relief outlet 4 (see Fig. 2) is preferably formed integral with the relief casing 1. The relief casing chamber 5 houses the ball 6 which is set in recess 7 of the valve guide 8. The guide 8, in addition, has a projecting lug portion 10 so as to securely engage the spring member 11. The ball 6 is maintained against the casing seating surface 9 in the normal course of valve operation by means of the spring member 11 which has an adjustable tension imposed thereon by means of the slotted adjusting screw 12. Adjusting screw 12 threadedly engages the relief valve body at 13 and the cap member 14 by means of the threads 15. The cap locking pin 16 maintains the cap member 14 non-removable from the relief valve casing 1 and therefore the blow-off pressure setting is maintained in substantially tamper-proof condition. The lower portion 30 of relief valve stem 17 more clearly depicted in Fig. 4 is slotted or milled at 21 and rotatably engages the inner annular surface 19 of the valve guide 8. The upper portion of stem 17 is apertured at 20 to receive lever pin 31 which secures the lever 28 thereto.

It will be noted from Fig. 1 that the relief valve stem portion 30 is in offset position relative to the inner annular surface 19 of the valve guide 8. Consequently, upon rotation of the stem member 17 when manual relief of the valve is desired, the portion 30 of the stem member rotatably and slidably contacts the inner annular surface 19 of the valve guide 8 forcing the said guide member to proceed in an upward axial direction, in opposition to the spring member 11. Concomitantly, the ball member 6 is enabled to leave the seating surface 9 by virtue of the line pressure which is allowed to escape through the relief outlet 4.

It will be further noted that the stem member 17 is journalled at the long end limit in the casing recess 22 and at the opposed upper limit in the packing nut 23 which threadedly engages the casing member 1 at 24. O-ring 25 maintains the stem-packing nut aperture in a fluid-tight condition. Lever spring 26 is secured at one end limit in slot 27 of lever member 28 and is fixedly attached at the opposite end limit on the lever spring anchor pin 29, as more clearly seen in Fig. 2. The lever pin 31 or other suitable means maintains the lever member 28 and relief stem member 17 in fixed engagement. The stop pin 32 more clearly seen in Fig. 2 defines the end limit of the angular movement capable of being described by lever member 28 in the course of effecting manual relief of the line pressures. It is, of course, apparent that the tension imposed by the lever coiled spring 26 will automatically reset the ball 6 on the relief valve seat surface 9 upon release of the lever member 28.

Referring now to the check valve assembly incorporated in our invention, the check valve body 2 is depicted as being threadedly engaged to the projecting portion 33 of the relief valve body 1 by means of the threads 3. Projecting portion 33 has a recessed portion 34 which receives the check valve stem 35. The check valve stem 35 has a hollow core 51 and comprises the projecting portion 36 at the lower end limit and shoulders against the relief casing annular surface 37 at the upper stem end limit. The check valve stem 35 also has ports 40 to allow fluid in the pipe line and valve casing to enter the center hollow portion of the stem member and proceed upwardly therethrough into the relief valve portion. The O-ring member 39 prevents the passage of any fluid to the threaded casing interface at 3.

Check valve ball 41 is interposed between the stem projecting portion 36 and the spring member 42. The latter spring is housed in the recess 43 of the check valve casing 2. The spring retaining nut 44 threadedly engages casing 2 at 45 and abuts against the lower end limit of the spring member 42. The ball 41 in the course of check valve operation seats on the surface 46. The seating surface 46 defines the lower portion of a constriction 48 which separates the spring recess 43 from the relief valve receiving recess 52. The lower end portion of the check valve casing 2 is threaded at 47 or otherwise formed for suitable engagement to a pipe line, valve body or casing, or other suitable pressure vessel.

In the normal course of operation, it should be understood that fluid flow proceeds through the aperture 49 of the retaining nut 45 upwardly through spring recess 43 of check valve casing 2 and through the chamber separating constriction 48. It will be noted that when the check-valve portion of our invention is not functioning, the stem projecting portion 36 maintains the check ball 41 off the seating surface 46, thereby allowing the line fluid pressure to be effective through the check valve casing constriction 48 as above mentioned. The fluid pressure then proceeds through the ports 40 of the stem 35 through the hollow core 51 of the stem 35 through the relief valve casing reduced orifice 53 at which point the pressure in the system is opposed by the predetermined and preset tension of the relief valve spring 11, which maintains the relief valve ball 6 in fluid sealing engagement with seating surface 9 by means of the interposed valve guide 8.

Therefore, it is obvious that until pressure in the system exceeds the predetermined tension of the relief spring 11 the ball 6 will remain in fluid sealing engagement with the seating surface 9 preventing the escape of pressure through the relief outlet 4. When the tension on the compression load of the spring 11 is exceeded, however, the ball 6 forces guide 8 in the spring 11 to proceed in an upward axial direction thereby allowing fluid pressure to enter, moving past the seating surface 9, and thereby on to relief outlet 4.

After the pressure in the piping system has been reduced to an amount below the setting of the relief spring 11, the ball 6 will once more be forced into fluid sealing engagement with seating surface 9. It is thus apparent that the relief valve portion of my novel construction may be either manually operated by means of the lever member 28 after which lever spring 26 will automatically reset ball 6 in fluid sealing engagement with seating surface 9; and as has previously been described, relief spring member 11 will automatically reseat ball member 6 in fluid sealing engagement with seating surface 9 after the excess pressure has escaped through outlet 4.

Referring now to Fig. 3, a sectional view taken on line 3—3 of Fig. 1 is depicted in which the maximum upward axial travel of the valve guide 8, and therefore the maximum distance ball 6 may be moved from its seat 9, may readily be noted.

Maximum removal of the ball 6 from its seat 9 by manual operation is effected when the stem 17 has been rotated 180 degrees. The lower stem portion 30 will then raise the valve guide 8 upwardly a distance equal to the lineal distance between the uppermost portion of the dotted line 54, which is the end limit of the stem 17, and the uppermost portion of the periphery 19 of the valve guide 8 as measured along the central longitudinal axis of the valve. This distance represents the maximum distance ball 6 may rise from its seat when manually relieving the valve.

The maximum distance ball 6 may rise from its seat when the line pressure exceeds the tension in the spring 11 is equal to the lineal distance between the lowermost portion of the periphery of the annular valve guide surface 19 and the lowermost point of the stem portion 30 as measured along the central or longitudinal axis of the valve. It is readily appreciated that the maximum distance the ball 6 may move from its seating surface 9 may be governed by design of the stem member 17 and the magnitude of the diameter of the aperture defined by the valve guide annular surface 19.

As has previously been stated in the objects of our invention, repairs may be made to any member of the relief valve assembly without interrupting fluid flow in the system. This may be accomplished merely by threadedly retracting the projecting portion 33 of relief valve casing 1 a distance sufficient to allow the check ball 41 to seat against the fluid sealing surface 46. As is obvious from Fig. 1, this adjustment distance is reached when the projection 36 no longer contacts the ball member 41. Consequently, check valve spring member 42 then maintains ball 41 in fluid sealing engagement with seating surface 46 unopposed by the projection 36 of the ported relief stem member 35.

Thus, it is obvious to those skilled in the art that we have provided a novel valve construction incorporating both check valve and relief valve functions utilizing a minimum of parts. The dual nature of our invention enables repairs to be effected in the relief valve portion of our construction without halting fluid flow in the system. Furthermore, the relief valve portion of our construction may be manually operated when so desired. The resilient spring members utilized in our construction insure an automatic resetting of the relief valve member following the occurrence of either a manually induced or line pressure induced blow-off.

It is well recognized by those skilled in the art that many changes and modifications of the valve components of the illustrated structure may be effected and still remain within the ambit of our inventive principles, and we therefore wish to be limited only by the scope of the appended claims.

We claim:

1. A valve construction comprising upper and lower casing members, one of said members extending within a hollow portion of the other and being threadedly received therewithin for superposed mounted relation of the members, a valve chamber in each of the casing members, the chamber in the upper member having an upwardly facing seat, the chamber in the lower member having a downwardly facing seat, a ball valve member in each of the said chambers engageable with the respective seats, means within the chamber of the lower member biasing its valve member towards its seat and means within the latter chamber retaining the biasing means and apertured for fluid flow therethrough, means biasing the valve member in the upper casing member chamber towards its valve seat, said latter biasing means comprising reciprocally movable means being recessed at the bottom for reception of at least the upper portion of the latter ball valve member and spring means abutting an upper surface of said reciprocally movable means for urging the latter means downwardly, adjustable means at the upper end of the said upper casing member for retaining the spring means within the upper chamber at the desired compression, a flow passage extending between the said valve chambers, said flow passage extending through each of the said seats, means extending from the upper casing member through the flow passage in the lower seat to prevent seating of the ball in the lower casing chamber when said chamber members are in fully assembled tightly threaded relation, said latter means extending through the lower seat passage being at least partly withdrawable upon unthreading said casing members to permit the lower ball member to effect fluid tight seating with the lower seat under action of lower biasing means and fluid pressure, said reciprocally movable means being transversely relieved in a direction normal to the reciprocal movement thereof, rotatable means extending within said transverse relief adapted to raise the reciprocally movable means to permit upward movement of the upper ball valve member upon rotation of the latter extending rotatable means, lever means on said rotatable means for effecting this movement and coil spring means secured at opposite ends thereof to said lever and the upper casing member to return the lever means to its original position, said lower casing member having external threads at its lower end.

2. The subject matter of claim 1, said means extending through the flow passage in the lower seat comprising a loose member received within the said flow passage and engaged in abutment by the upper casing member and the lower ball member, said loose member having a hollow core along a substantial extent thereof, said core being open at the top and in communication with a lower unoccupied portion of the flow passage by openings whereby to permit flow through said loose member and out therefrom into the flow passage in the lower seat.

3. The subject matter of claim 1, said lower casing member being substantially smaller at its threaded end than the upper casing and being adapted to be inserted into an opening in a pressure vessel for ready fluid tight mounting therewith.

References Cited in the file of this patent

UNITED STATES PATENTS

| | | |
|---|---|---|
| 415,469 | Porter | Nov. 19, 1889 |
| 2,271,031 | Parker | Jan. 27, 1942 |
| 2,415,258 | Parker | Feb. 4, 1947 |
| 2,466,972 | Slomer | Apr. 12, 1949 |
| 2,516,424 | Roney | July 25, 1950 |
| 2,608,992 | Folmsbee | Sept. 2, 1952 |

FOREIGN PATENTS

| | | |
|---|---|---|
| 541,310 | Germany | Jan. 6, 1932 |